(12) United States Patent
Dabelstein et al.

(10) Patent No.: US 9,511,536 B2
(45) Date of Patent: Dec. 6, 2016

(54) METHOD AND APPARATUS TO ASSIST WITH REMOVING AN ADHESIVE SYSTEM

(75) Inventors: Donald K. Dabelstein, Renton, WA (US); Michael E. Rorabaugh, Seattle, WA (US); Stacey A. Sullivan, Wichita, KS (US); Glenn A. Hopper, Augusta, KS (US)

(73) Assignee: The Boeing Company, Chicago, IL (US)

(*) Notice: Subject to any disclaimer, the term of this patent is extended or adjusted under 35 U.S.C. 154(b) by 2006 days.

(21) Appl. No.: 11/334,797

(22) Filed: Jan. 18, 2006

(65) Prior Publication Data

US 2006/0162855 A1 Jul. 27, 2006

Related U.S. Application Data

(63) Continuation-in-part of application No. 10/273,797, filed on Oct. 18, 2002, now abandoned.

(51) Int. Cl.
| | | |
|---|---|---|
| *C09J 11/00* | (2006.01) | |
| *B29C 63/00* | (2006.01) | |
| *C09J 5/06* | (2006.01) | |

(52) U.S. Cl.
CPC .............. *B29C 63/0013* (2013.01); *C09J 5/06* (2013.01); *C09J 11/00* (2013.01); *C09J 2205/11* (2013.01); *Y10T 156/16* (2015.01)

(58) Field of Classification Search
CPC ....... B29C 63/0013; C09J 11/00; C09J 5/06; C09J 2205/11
USPC ............ 156/247, 278, 325, 344, 272.4, 712; 521/56, 76; 428/40.2, 313.3, 313.5, 428/317.5, 317.7, 192
See application file for complete search history.

(56) References Cited

U.S. PATENT DOCUMENTS

| | | | |
|---|---|---|---|
| 3,620,875 A * | 11/1971 | Guglielmo et al. | ....... 156/272.4 |
| 3,989,984 A | 11/1976 | Amason et al. | |
| 4,352,142 A | 9/1982 | Olson | |
| 4,986,496 A | 1/1991 | Marentic et al. | |
| 5,069,403 A | 12/1991 | Marentic et al. | |
| 5,133,516 A | 7/1992 | Marentic et al. | |
| 5,443,912 A | 8/1995 | Olson | |
| 5,499,782 A | 3/1996 | Domine | |
| 5,580,819 A | 12/1996 | Li et al. | |
| 5,609,954 A * | 3/1997 | Aizawa et al. | ............ 428/317.5 |

(Continued)

FOREIGN PATENT DOCUMENTS

| | | | |
|---|---|---|---|
| EP | 1033393 A2 | * | 9/2000 |
| EP | 1111020 | * | 6/2001 |

(Continued)

OTHER PUBLICATIONS

Machine translation for Europe 1111020 (no date).*

(Continued)

*Primary Examiner* — Steven D Maki
(74) *Attorney, Agent, or Firm* — Patterson & Sheridan, LLP

(57) ABSTRACT

Disclosed is an adhesive system that allows for a strong adhesion of a member to a surface, while also allowing for easy removal of the member after a prolonged period of attachment. A releasing agent can be included in an adhesive layer of the adhesive system. A heating system, such as an induction heating system, can be used to heat the releasing agent to activate it to assist in removing the adhesive system.

4 Claims, 4 Drawing Sheets

(56) References Cited

U.S. PATENT DOCUMENTS

| | | |
|---|---|---|
| 5,660,667 A | 8/1997 | Davis |
| 5,806,796 A | 9/1998 | Healey |
| 5,824,391 A | 10/1998 | Davis |
| 5,965,256 A | 10/1999 | Barrera |
| 6,101,783 A | 8/2000 | Howes |
| 6,177,189 B1* | 1/2001 | Rawlings ............... C09J 7/026 156/304.3 |
| 6,288,170 B1* | 9/2001 | Waid ............................. 525/113 |
| 6,417,253 B1 | 7/2002 | Shakhnovich |
| 6,475,616 B1 | 11/2002 | Dietz et al. |
| 6,478,915 B1 | 11/2002 | Schmalbruch et al. |
| 6,790,526 B2* | 9/2004 | Vargo et al. .................. 428/343 |
| 2002/0081921 A1 | 6/2002 | Vargo et al. |
| 2003/0152766 A1* | 8/2003 | Vargo et al. .................. 428/343 |
| 2004/0076817 A1* | 4/2004 | Rorabaugh et al. ....... 428/320.2 |
| 2004/0091694 A1* | 5/2004 | Holzer et al. ................. 428/323 |
| 2004/0249037 A1* | 12/2004 | Kolbe et al. .................. 156/344 |
| 2005/0003131 A1 | 1/2005 | Ishikawa et al. |
| 2005/0181203 A1 | 8/2005 | Rawlings et al. |
| 2006/0051592 A1 | 3/2006 | Rawlings et al. |
| 2013/0034739 A1* | 2/2013 | Boday ..................... B01J 13/18 428/447 |

FOREIGN PATENT DOCUMENTS

| | | | |
|---|---|---|---|
| FR | 2837114 | * | 9/2003 |
| JP | 63-186791 A | * | 8/1988 |
| JP | 07-145357 | * | 6/1995 |
| JP | 07-145357 A | * | 6/1995 |
| WO | WO 99/65674 | | 12/1999 |
| WO | WO 00/75254 | * | 12/2000 |
| WO | WO -00/75254 A1 | * | 12/2000 |

OTHER PUBLICATIONS

Machine translation for France 2837114 (no date).*
Machine translation for Japan 07-145357 (no date).*
Machine translation for Japan 63-186791 (no date).*
Loctite® Material Safety Data Sheet, Henkel Technologies, revision date Apr. 20, 2005.
Henkel Aerospace Group, SynSkin® Handling Procedures, date unknown.
Henkel Aerospace Group, Literatur, page from web site http://www.aerospace.henkel.com/index.cfm?ID=117, copyright 2000.
SAE International Aerospace Engineering Online, Ace 2001 highlights, BAE Systems and EADS explore lightning strike protection, printed from web page http://www.sae.org/aeromag/features/ace/2001/highlights/page4.htm, printed Mar. 28, 2006.
Antistatic & Barrier Bags, web page (in Japanese) http://www.youlchon.com/youlchon2002/product/carrier/bags, Copyright © 2002 Youlchon chemical Co., Ltd., printed Mar. 28, 2006.
Estech, Class 100 Zone Environment, Static Shielding Bag, web page http://www.estech-kr.com/staticbag.htm, Copyright © 2003 ESTECH, printed Mar. 28, 2006.

* cited by examiner

METHOD AND APPARATUS TO ASSIST WITH REMOVING AN ADHESIVE SYSTEM

CROSS-REFERENCE TO RELATED APPLICATIONS

This application is a continuation-in-part of U.S. patent application Ser. No. 10/273,797 filed on Oct. 18, 2002. The disclosure of the above application is incorporated herein by reference.

FIELD

The present disclosure relates to releasable adhesives, and more particularly relates to an adhesive layer to bond a member to a surface which includes a releasing agent in the adhesive layer that allows the member and the adhesive layer to be easily removed from the surface.

BACKGROUND

Many items and films are often bonded to a substrate or surface using an adhesive. Examples of these items include appliqués, stickers, and tape. Many of these items are meant to be affixed only temporarily to the substrate. The adhesives are often so formulated as to be a temporary adhesive so that the item adhered to the surface can be easily removed in the future. Many times these adhesives, however, become tenacious or hard to remove. With time and exposure to different elements, the once weak adhesive may become tenacious and not allow the removal of the item. Also, once a difficult adhesive is removed, residue is left behind. This must also be removed before a new adhesive film is applied. Therefore, the temporary item becomes essentially permanently secured to supporting surface. In addition, the adhesive often becomes nearly impervious to solvents at this point. On the other hand, weak adhesives may not be strong enough to secure an item for the temporary period desired. Therefore, after only a short time, and before it is desired to remove the item, the item may no longer be adhered to its support surface. Additional edge sealants and the like are sometimes added to prevent premature separation initiating from the edge.

Often the environment which the item is exposed to, after being affixed to a support surface, affects the longevity of the adhesive. In particular, ultra-violet (UV) exposure or other atmospheric conditions may increase the tenacity of the adhesive such that it is no longer easy to remove the item from the supporting surface. Atmospheric or other conditions, to which the adhesive is subjected, may conversely decrease the longevity of the adhesive such that it no longer holds the item in place as desired.

Oftentimes, appliqués are designed to allow for a clean removal by removing the appliqué as one piece. Appliqués for large applications, however, such as markings or decorations on aircraft, are extremely large. Therefore, there is a large surface area which may suffer damage during the time which the appliqué is applied to the surface. This, in turn, reduces the ability to remove the appliqué as one piece, thereby reducing the possibility of a clean removal of the appliqué from the surface.

Additional or supplementary adhesives are often used to hold films in place, in addition to the main adhesive layer. For example, an edge sealant may be applied to the front surface of a film to ensure that the edge does not become loosened over a period of time, even though the majority of the adhesive on the back of the film may still remain in place. Furthermore, these edge treatments or adhesives are commonly used because of the designed lack of strength of the main or primary adhesive to hold the film, due to the need to be able to remove the film in the future.

Therefore, it is desired to provide an adhesive which will allow for easy removal of a film at a desired time. The adhesives will also be cleanly and substantially completely removed from the surface with the film. It is desired that this adhesive be particularly strong so that other treatments, such as edge treatments or sealants, need not be used because the adhesive on the film itself is strong enough to hold the film in place. Furthermore, it is desired that the adhesive be strong enough to allow for generally impervious adhesion of the film to the substrate regardless of the conditions to which the film is exposed. Nevertheless, the film still needs to be readily removable when desired, and only when desired. Therefore, it is desired that the adhesive includes not only the strength and longevity of very strong adhesives, but also includes the ability to be removed easily without resorting to special chemicals.

SUMMARY

The adhesive system of the present disclosure allows for a strong adhesion of a member, including a structural support, a film or other appliqué, to a substrate while also allowing for easy removal of the member at a predetermined time. The member is affixed to a substrate with an adhesive, where the adhesive includes a releasing agent or constituent. The releasing agent allows for a substantially clean removal of the adhesive and easy removal of the member at a desired time in the future due to the application or presence of a particular catalyst. For example, a micro-balloon containing a gas may be included in the adhesive, which is activated by heat, such that it will expand and push off the film for easier removal by an operator.

A first embodiment of the present disclosure includes an adhesive layer to form a bond between a film and a substrate. The adhesive layer includes an adhesive agent that is curable to form the bond between the film and a surface of the substrate. A releasing agent is dispersed in the adhesive layer that is selectively activated to weaken the bond between the film and the surface. When the releasing agent is activated the film may be substantially removed from the substrate.

A second embodiment of the present disclosure includes a system able to allow for the substantial removal of a film that is bonded to a substrate. The film of the system includes a generally deformable sheet. The substrate includes a surface to which the film is bondable. An adhesive is placed between the film and the substrate to substantially form a bond between the film and the surface. A releasing agent is dispersed in the adhesive and is selectively activated to substantially remove the bond between the film and the surface.

The present disclosure includes a method of bonding a film to a surface of a substrate such that the film is selectively removable. An adhesive selectively bonds the film to the surface. A releasing agent is dispersed in the adhesive. The film is then bonded to the surface with the adhesive such that the film is substantially affixed to the surface. An additional feature of the disclosure is that releasing agent may be activated such that the releasing agent substantially destroys the bond between the film and the surface.

Various techniques for applying an appliqué, such as a member or layer of material, to a substrate are disclosed herein. The various appliqués are adhered to a substrate with selected adhesives, such as thermosetting polymers, apoxy, or the like. As discussed herein, various releasing agents, such as micro balloons, chemical degraders, and the like, can be used to assist in removing the appliqués and the adhesive from the substrate. The releasing agent can be activated with a selected component. For example, a chemical agent can be used to activate the releasing agent. Nevertheless, other components can be used to activate the releasing agent.

For example, the releasing agent can be heat activated to provide for a degradation of an adhesive layer with the application of the selected heat. It will be understood that the activation of the releasing agent can be performed with the heating system to activate the releasing agent to degrade or break the bonding of the adhesive. For example, an induction heating system can be used to apply heat in a non-contact manner to the appliqué, the substrate, or a portion of the appliqué to activate the releasing agent. The induction heating system can be any appropriate heating system that can be used in a manner that allows for easy and efficient creation of thermal energy within an adhesive layer of an appliqué.

Further areas of applicability of the present disclosure will become apparent from the detailed description provided hereinafter. It should be understood that the detailed description and various examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE VARIOUS EMBODIMENTS

The following description of various embodiments is merely exemplary in nature and is in no way intended to limit the disclosure, its application, or uses. It will also be understood that the figures relating to the various embodiments are schematic and representative only. They are not meant to be to scale either real or relative. The layer thicknesses are illustrative only to better understand the disclosure. Moreover, although the following discussion relates to examples including adhering films to a substrate it will be understood that other items may be affixed to a substrate with the adhesive systems as disclosure herein.

Figure 1:
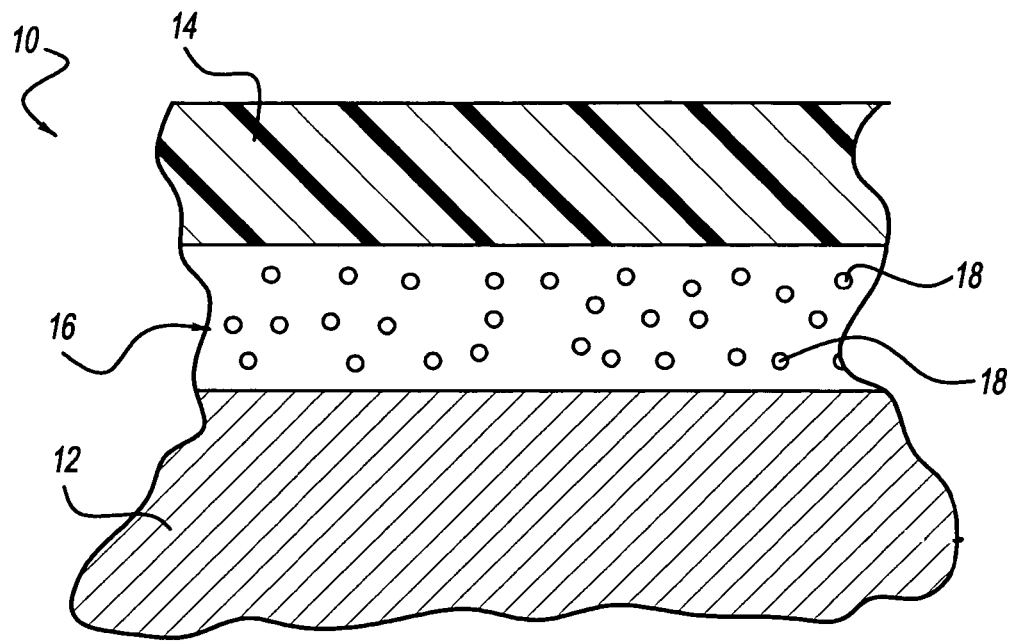
FIG. 1 is a cross-sectional view of a film adhered to a substrate including a releasing agent according to various embodiments.

An adhesive release system 10 is illustrated in FIG. 1. The system 10 generally includes a substrate 12 to which component or member, in this example a film 14, is bonded. The film 14 may include an appliqué or decal and is adhered using an adhesive layer 16. Exemplary films and appliqués include the following:

U.S. Pat. No. 6,417,253 entitled "Color Stable Compositions Containing Arylate-Comprising Polymers";
U.S. Pat. No. 6,177,189 entitled, "Appliqués Providing Corrosion Protection";
U.S. Pat. No. 5,965,256 entitled, "Protective Films and Coatings";
U.S. Pat. No. 5,824,391 entitled, "Appliqués To Eliminate Painted Coatings On Surfaces Having Complex Curvature";
U.S. Pat. No. 5,660,667 entitled, "Method Of Coating Surfaces Using Appliqués Of Constant Gaussian Curvature";
U.S. Pat. No. 5,580,819 entitled, "Coating Composition, Process For Producing Antireflective Coatings, And Coated Articles";
U.S. Pat. No. 5,133,516 entitled, "Drag Reduction Article";
U.S. Pat. No. 5,069,403 entitled, "Drag Reduction Article";
U.S. Pat. No. 4,986,496 entitled, "Drag Reduction Article";
PCT Publication No. WO 99/65674 entitled, "Edge Seal and Sealing methods for Appliqués";
each incorporated herein by reference.

The adhesive layer 16 substantially permanently, but selectively, affixes the film 14 to the substrate 12. The film 14 is also selectively removable such that it is not easily or readily removed from the substrate 12 unless it is desired to be removed by an operator.

The adhesive layer 16 may include an adhesive appropriate for the particular application. Furthermore, when the adhesive layer 16 includes a releasing agent 18, the adhesive layer 16 may include an adhesive agent which is particularly strong. The adhesive agent may include solvent bound organic molecules which form the bonds between the film 14 and the substrate 12 after the solvent has evaporated. Particular formulations for the releasing agent 18 are generally known in the art and include, for example, Expancel® 810 DU produced by Expancel, Inc., especially for temporary coatings on aircraft support equipment. With the use of the system as presently disclosed, especially strong adhesive agents may be used due to the inclusion of the releasing agent 18.

The adhesive layer 16 can be any appropriate thickness, such as thin and can be a pressure sensitive adhesive. The adhesive layer 16 can be formed to be as thick or thinner than the film layer 14. The adhesive layer 16, for example, can be about 0.0001 mm to about 1 mm thick. It will be understood, however, that the adhesive layer 16 can be any appropriate thickness.

The adhesive layer 16 further includes the releasing agent 18. The releasing agent 18 may include micro-balloons, blowing agents or chemicals, or solvents. The releasing agent 18 allows for removal of the film 14 at a predetermined point in the future. Generally, the releasing agent 18 only allows removal of the film 14 when a particular condition or catalyst is applied to the adhesive layer 16 through or around the film 14. The releasing agent 18 can act in several ways including expanding to push the film 14 away from the substrate 12. Only when it is activated does the releasing agent 18 allow for a destruction or expansion of the adhesive layer 16 between the film 14 and the substrate 12.

The film 14 may include generally known items. For example stickers, masking tape, decorative striping, or large appliqués for applications such as aircraft may be included as the film 14. These films 14 are generally formed of polymers set to form the film 14. The film 14 can be understood to be a substantially thin and flexible film, according to various embodiments. For example the film may be about 0.001 mm to about 1 mm thick, and can depend upon the material of the film 14. Nevertheless, the film 14 can be flexible for various applications.

The film 14 may also include an ink or marking layers. For example, a large decal appliqué may be placed on an aircraft exterior to signify the trade name or origin of the aircraft. The appliqués for aircraft are relatively large since they must cover a substantial portion of the exterior surface of an aircraft. Other examples include masking tape which may be used in modern construction and domestic use. The masking tape is generally applied with the intent to remove it completely at a predetermined future time. It will be appreciated that the present disclosure, however, is not limited to films or appliqués, but may comprise virtually any component or object capable of being secured to a substrate or other like supporting component.

The system 10 advantageously allows for easy removal of the film 14 when the releasing agent 18 is activated. As illustrated particularly in FIG. 2, the activated releasing agent 20 substantially destroys portions of the adhesive layer 16. In addition, the activated releasing agent 20 can push the film 14 away from the substrate 12, thus beginning the process of removing the film 14.

Figure 2:
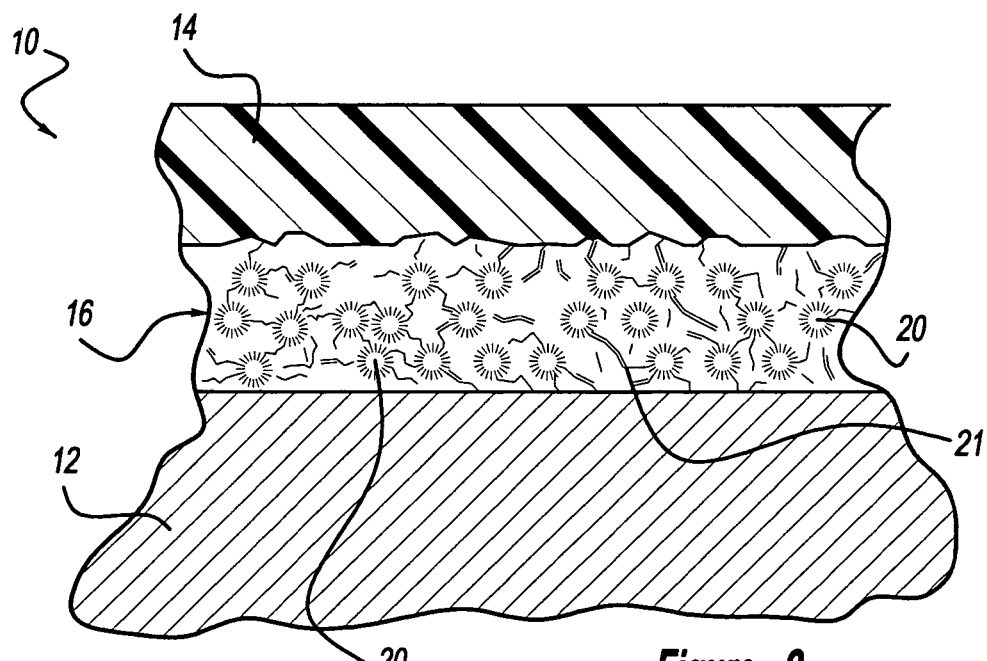
FIG. 2 is a cross-sectional view where the releasing agent has been activated according to various embodiments.

One exemplary process, as illustrated in FIG. 2, provides micro-balloons as the releasing agent 18. The micro-balloons 18 are generally activated by a heat source. As the micro-balloons 18 increase in temperature, the gas contained within the micro-balloons 18 expands. As the gas within the micro balloon 18 expands the micro-balloons 18 become the activating releasing agent 20. At this point, the gas continues to expand destroying the bonds of the adhesive layer 16 by producing a plurality of voids and cracks 21. As the cracks 21 and voids are produced, the pressure within the adhesive layer 16 is increased and a pressure between the film 14 and the substrate 12 is also increased. When this happens, the pressure destroys the bond of the adhesive layer 16 between the substrate 12 and the film 14, thereby loosening the film 14. In addition, the film 14 is physically pushed away if portions of the activated releasing agent 20 are sufficiently close to the under surface of the film 14.

Many items may be utilized as the releasing agent 18. For example, micro-balloons may be used as the releasing agent 18. Generally, a micro-balloon will include a small encapsulated volume of gas or liquid. The micro-balloons are disbursed in the adhesive layer 16 when the adhesive layer 16 is either applied to the substrate 12 or when the film 14, with the adhesive layer 16, applied thereto is applied to the substrate 12. When the micro-balloons are heated they expand, thereby increasing the pressure between the film 14 and the substrate 12. Various heat sources may provide the appropriate degree of heat for activating the micro-balloons. Such heat sources may include flash lamps, hot water, infrared light, or even a hair dryer for a more domestic use.

During a removal procedure, as the micro-balloons are heated, the gas inside each micro-balloon expands, thereby destroying the bond of the adhesive layer 16. The micro-balloon may be changed for different applications to react to a specific temperature to give greater control over its activation. After this occurs, the film 14 is substantially loosened from the substrate 12 and may be easily removed. In addition, the adhesive layer 16 is also substantially destroyed and can therefore be more easily removed from the substrate 12.

Other releasing agents 18 include blowing agents. Blowing agents are chemically activated constituents which produce a gas when activated. One exemplary blowing agent includes Celogen® blowing agent 765A which may be obtained from Uniroyal Chemical Company, Inc. The blowing agent generally evolves or releases a gas when catalyzed by particular catalysts. Therefore, even though the blowing agent can evolve a gas, it will only evolve the gas when catalyzed at a predetermined point in the future. The blowing agent may also be catalyzed by heat or a chemical catalyst. In any case, when the blowing agent is activated it produces pressure between the film 14 and the substrate 12, such that the film 14 is substantially pushed away from the substrate 12. This also allows for easy removal of the film 14 from the substrate 12 only at a predetermined point when the blowing agent is activated.

Another example of the releasing agent 18 includes a solvent. The solvent is applied in a neutral state in the adhesive layer 16, but may be activated by a heat or a chemical catalyst. Therefore, the simple addition of this catalyst changes the neutral solvent to an activated form. When activated, the solvent dissolves the adhesive layer 16 allowing for easy removal of the film 14 from the substrate 12.

Therefore, the present disclosure allows for easy removal of the film 14 from the substrate 12. Because the film 14 may be easily removed, even stronger adhesives may be used in the adhesive layer 16, where weak adhesives were previously used because of the need for easy removal of the film 14. Because of the releasing agent 18, a stronger adhesive can be used which does not decrease the ability to remove the film 14 from the substrate 12 at a predetermined point in the future.

Furthermore, the releasing agent 18 allows for a substantially clean removal of the adhesive layer 16 and the film 14 from the substrate 12. Because the releasing agent 18 is dispersed throughout the adhesive layer 16, substantially all of the adhesive layer will be affected by the releasing agent 18. This allows for a substantially complete destruction of the bond formed by the adhesive layer 16 between the film 14 and the substrate 12. When this occurs, substantially no bond is left to hold the film 14 to the substrate 12.

Figure 3:
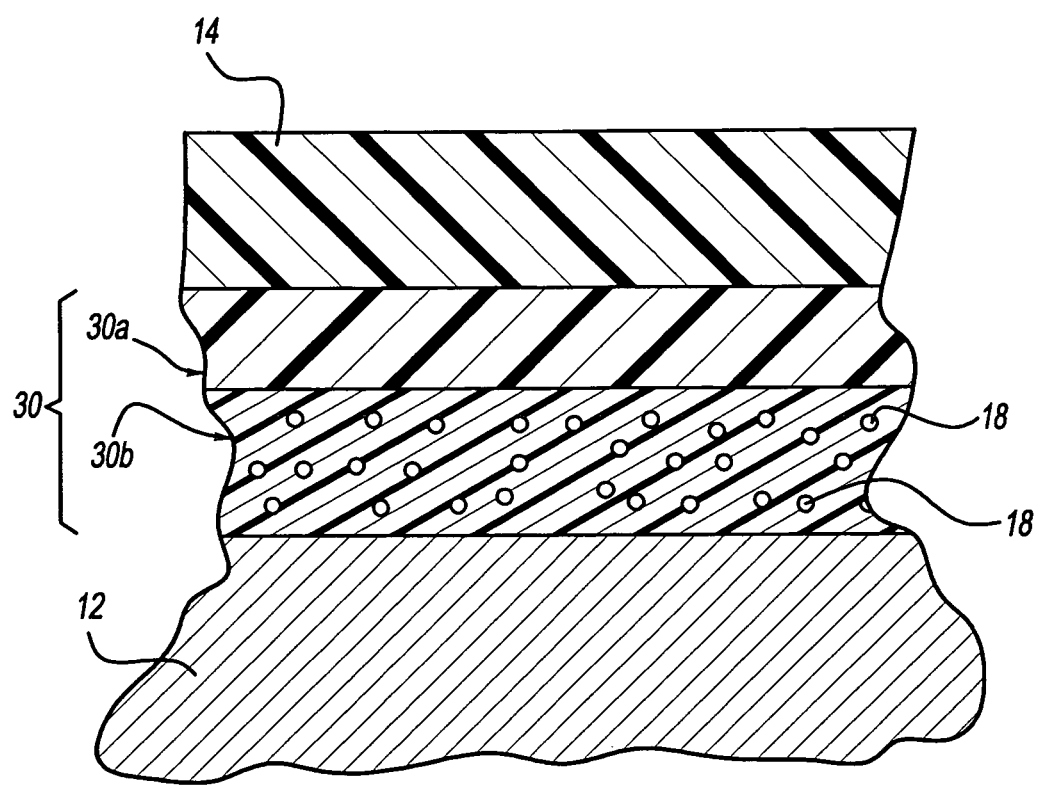
FIG. 3 is a cross-sectional view where the releasing agent is provided only in one thin layer in a multilayer adhesive.

The releasing agent 18 may also be precisely placed in the adhesive layer 16 to remove substantially the entire adhesive layer 16. Although the activated releasing agent 20, as illustrated in FIG. 2, is substantially evenly distributed throughout the adhesive layer 16, the distribution may be more controlled by controlling the placement of the releasing agent 18. With reference to FIG. 3, where like numerals reference like items from above, a substantial portion of an adhesive layer 30 may be removed with the film 14. The adhesive layer 30 may be applied as several layers to either the film 14 or the substrate 12. The adhesive layer 30 may be applied including a first adhesive layer 30a and a second adhesive layer 30b. The releasing agent 18 is provided only in the second adhesive layer 30b, the layer placed closest to the substrate 12. Therefore, the releasing agent 18 may be placed substantially closer to the substrate 12 than to the film 14. When the releasing agent 18 is concentrated near the substrate 12, activating the releasing agent 18 pushes away the film 14 and a substantial portion of the first adhesive layer portion 30a as well. Due to this, a clean and complete removal of the film 14 and the adhesive layer 30 may more easily occur. Alternatively, the releasing agent 18 may be concentrated in the layer of the multi-layer adhesive 30 which is closer to the film 14. This may be desired when the adhesive is being applied to a difficult to bond substrate or when the releasing agent 18 may interfere with a strong bond between the adhesive layers 30 and the substrate 12.

The complete removal of the adhesive layer 16 or 30 is particularly relevant when large films 14 are applied to weight sensitive structures such as aircraft. Because weight is a paramount concern for aircraft, and weight reduction is highly desirable, the use of releasing agent 18 can ensure the substantial removal of the entire adhesive layer 16 or 30 and film 14. Therefore, when the film 14 and the adhesive layer 16 or 30 are removed from the substrate 12, which in this example is an aircraft, it is assured that substantially no residue is left to increase the weight of the aircraft.

Although the above description exemplarily describes adhering the film 14 to the substrate 12 with the adhesive layer 16, 30, it will be understood that other members or components may be affixed to the substrate 12 other than the film 14. For example, a structural component may be adhered to the substrate 12 using the adhesive layer 16, 30. In addition, other components and portions may be affixed to the substrate 12 which are neither films or structural components, such as panels and facades. Therefore, it will be understood that the adhesive removal system 10 including the adhesive layers 16, 30 may be used to affix any component, member, film, or appliqué to the substrate 12. In addition, other less industrial applications include using the adhesive layer 16, 30 to affix items such as wallpaper to walls or other surfaces.

Figure 4:
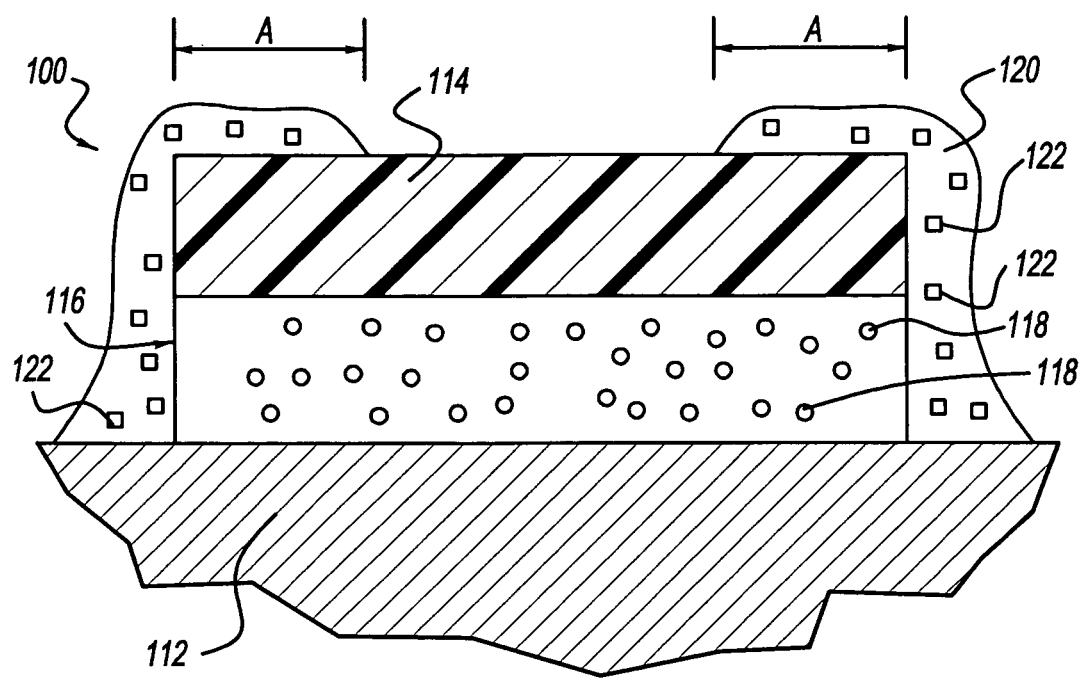
FIG. 4 is a cross-sectional view of a component bonded to a surface where a portion of an adhesive is covering the exterior of the component and where all portions of the adhesive include releasing agent.

With reference to FIG. 4 an adhesive release system 100 according to an alternative embodiment is illustrated. The adhesive release system 100 includes a substrate 112 to which a film 114 is adhered with an adhesive layer 116. Dispersed in the adhesive layer 116 is a releasing agent 118. The releasing agent 118 and the material of the adhesive film 116 may be any of the aforementioned releasing agents 18 or adhesive layers 16. Covering a portion A of the film 114 is an exterior adhesive layer 120. Generally, the exterior adhesive layer is an edge sealant that seals an edge of the film 114. Dispersed in the exterior adhesive layer 120 is an exterior releasing agent 122. The exterior releasing agent 122 may the same or different than the releasing agent 118. Moreover, the exterior releasing agent 122 may be activated at the same time or a different time than the releasing agent 118.

Therefore, although the previously-described examples include placing the adhesive layer 16, 30 between the film 14 and the substrate 12, it will be understood that the exterior adhesive layer 120, including the exterior releasing agent 122, may be placed on the exterior of the film 114. For example, the exterior adhesive layer 120 may be used as an edge sealant which is painted over the edge of the film 114 and onto the substrate 112 to assist in sealing the edges and resisting pull away or peel off initiating at the edge of the film 114. It will also be understood that the exterior adhesive layer 120 may be placed on the exterior of other elements and is not limited solely to films.

Figure 5:
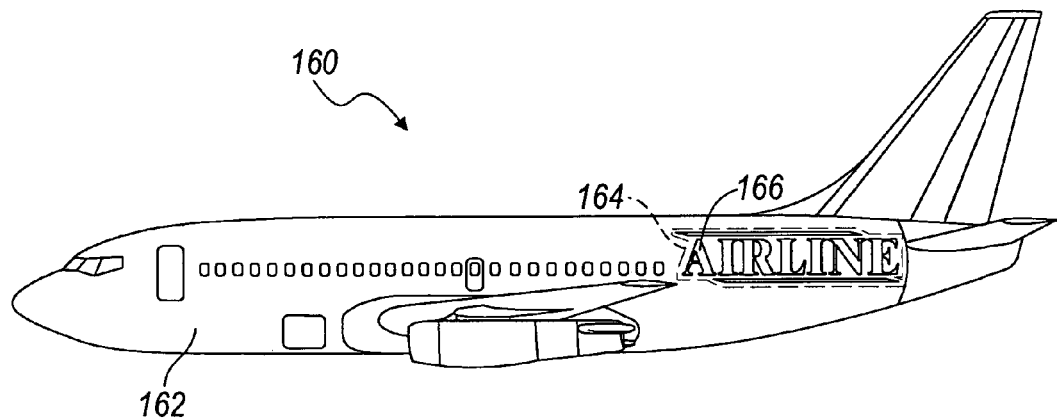
FIG. 5 is an environmental view of an appliqué on a substrate, such as an aircraft.

With reference to FIG. 5, an aircraft 160 can be the source of a substrate surface 162. As discussed above, the substrate 12, 112 according to various embodiments, can have an adhesive layer 16 provided between the film or appliqué 14 and the substrate layer 12. A substrate layer 162 of the aircraft 160 can be the substrate onto which an adhesive layer, such as the adhesive layer 16, can be placed.

The adhesive layer can bond an appliqué 164 to the substrate layer 162 according to various embodiments, such as the examples discussed above. The appliqué 164 can include any appropriate designs 166, writing, or the like, including the name of an airline, a trademark, a logo, or the like. It will be understood by one skilled in the art that any appropriate decal can be formed as the appliqué 164. The markings 166 on the appliqué 164 can be a part of the appliqué, applied to the surface of the appliqué 164, or be produced in any appropriate manner. In this manner, the appliqué 164 can be used to provide any appropriate designs onto an aircraft 160, such as those known in the art.

Although the appliqué 164 can be applied in any appropriate manner, including those discussed above, the appliqué 164 can also be removed due to the releasing agent, such as the releasing agent 18 included within the adhesive layer. It will be understood that the releasing agent can be any appropriate releasing agent, including those discussed above according to various embodiments.

Also, the appliqué 164, similar to the film 14 above, can be any appropriate thickness. For example, the appliqué 164 can be thin enough to be flexible, which can assist in application or removal of the appliqué 164. The adhesive layer can also be thin, or any appropriate thickness, such as those discussed above, for various applications. It will be understood that both the appliqué 164 and the adhesive layer can be about 0.001 mm to about 1 mm, and can be about 0.03 mm to about 0.20 mm. Although the thicknesses of the materials can be selected for various purposes, such as longevity, opacity, etc.

Also, the adhesive layer and the appliqué 164 can be selected based upon the substrate material and environmental concerns. For example the aircraft 160 can be formed of impervious metals or alloys or of composite materials. Also, the aircraft may be exposed to extreme environmental conditions, such as temperature, wind speed, abrasions, etc. Thus, the adhesive layer and the appliqué 164 can be selected to achieve a selected adhesiveness with these materials and to overcome or withstand the environmental conditions.

Although any appropriate releasing agent can be included in the adhesive layer, one that is heat activated can be used for selected applications, such as when applying the appliqué 164 to the aircraft 160. The heat activated releasing agent can be selected for various purposes such as reduced likelihood of accidental or unintended activation, resistance to chemical degradation or environmental degradation which can occur in various times during the lifespan of the appliqué 164 and the aircraft 160, or any other various reasons. Further, the heat activated releasing agent can be efficiently activated according to various techniques, including those discussed herein. Therefore, using heat activated releasing agent including those that might be apparent to those skilled in the art.

Figure 6:
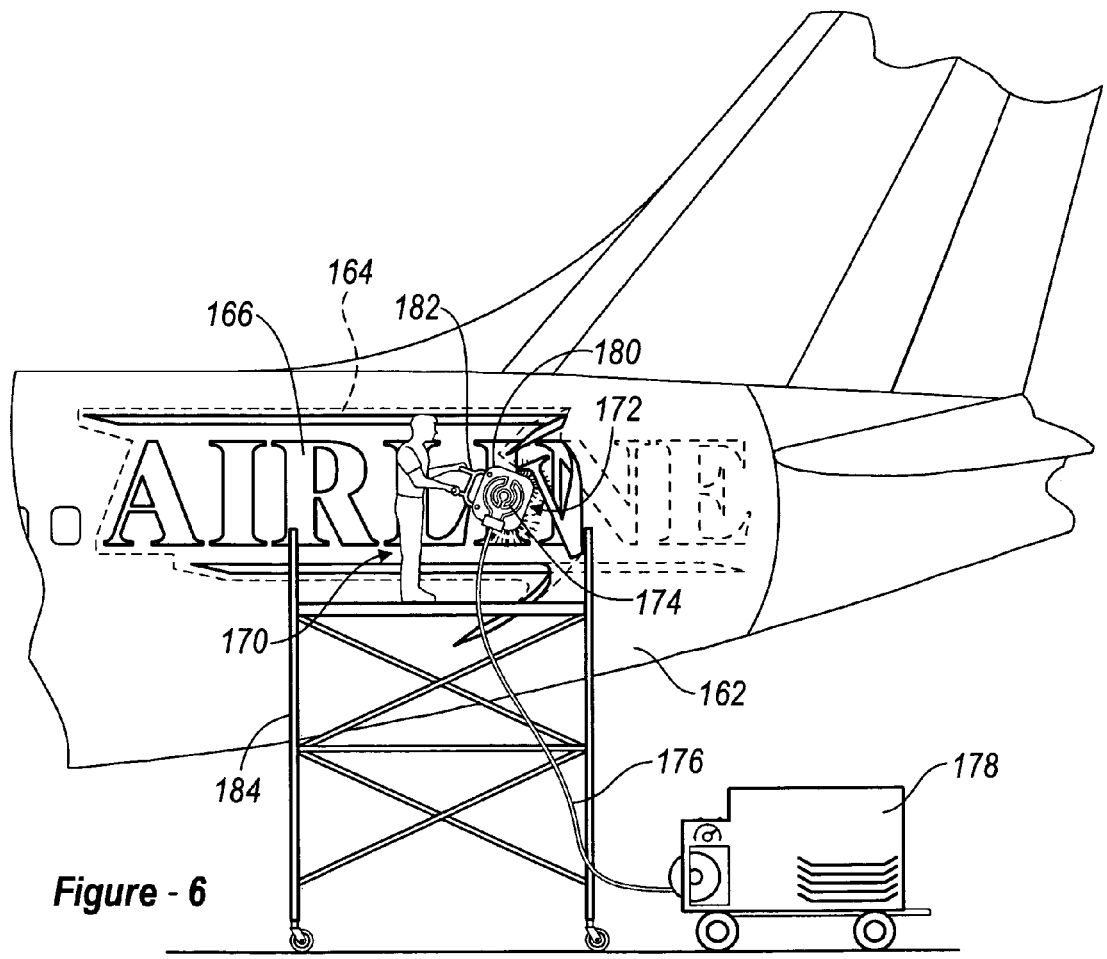
FIG. 6 is a detailed view of a user using an induction heating system to activate the releasing agent.

With reference to FIG. 6, the appliqué 164 which is adhered to the substrate 162 to be removed by a user 170. The appliqué or film 164 can be applied or bonded to the substrate in any appropriate manner. Further, various adhesives can be used in the adhesive layer. For example, a heat curable; air curable or any appropriate adhesive can be used (e.g. 3M's 966 adhesive). It will be understood that adhesives for us on an aircraft can be selected to withstand the environments to which high flying aircraft can be exposed. Though a specific adhesive is not required, one skilled in the art will understand that a selected adhesive can be chosen based on its adhesive properties. The inclusion of the releasing agent, however, in the adhesive layer can increase the options to a user due to reducing or eliminating the concern of removing the appliqué 164 and the adhesive at a later time.

The user 170 can be any appropriate individual such as a user of the aircraft, or any appropriate person. As discussed above, it may be selected to remove the appliqué 164 from the substrate 162 for various purposes, including maintenance of the aircraft 160, changing the markings 166 of the appliqué 164, or any other appropriate reason. Therefore, it will be understood that the user 170 may use a releasing agent activating device or activating device 172 to activate the releasing agent that can be in the adhesive layer that adheres the appliqué 164 to the substrate 162.

The activating device 172 can be any appropriate device, such as a heating device. The heating device can be, also, any appropriate device. For example, the heating device 172 can be an induction heating device. The induction heating device can include an induction coil 174 that is powered through a power cord 176 that extends from a power source 178. The power source 178 can power the induction coil 174 according to any appropriate method, including those generally known in the art.

The activating device 172 can include a case 180 that can incase the induction coil 174 and assist in directing the selected energy toward the adhesive layer under the appliqué 164. Further, a handle, such as a user handle 182, can be provided to be grasped by the user 170. It will be understood that the user 170 may also stand or use any sort of device, such as a scaffold 184 to hold the activating device 172 relative to the appliqué 164. Further, it will be understood, that the activating device 172 can also be interconnected with a robot or extending arm to be moved by the user 170 relative to the appliqué 164.

The activating device 172, including the induction coil 174, can be used to heat a specific area of the appliqué 164, or the entire area of the appliqué 164, for various purposes. As discussed above, heating the selected releasing agent can cause it to expand, breakdown, or the like to assist in destroying or weakening the adhesive layer, such as the adhesive layer 16. Therefore, the activating device 172, which includes the induction coil 174, can be used to heat the appliqué 164 or a selected layer or skin thereof.

As is generally understood by one skilled in the art, the power device 178 can provide a current, such as an alternating current, to the induction coil 174. The induction coil 174 can then set up a magnetic field within the material, such as a substrate 162. It will be understood that the substrate 162 can be any appropriate metal such as aluminum, steel, stainless steel, metal alloys, or the like. The fields produced or induced by the induction coil 174 in the substrate 162 can cause heat or thermal energy to be produced. The thermal energy can heat the adhesive or the releasing agent within the adhesive to activate the releasing agent. After being heated to a sufficient temperature, the releasing agent can be activated to assist in releasing the adhesive layer, such as the adhesive layer 16, to assist in removing the appliqué 164 and the adhesive layer from the substrate 162.

It will be understood that the induction coil 174 can be operated at any appropriate frequency, such as those frequencies understood by one skilled in the art. For example, a low frequency can be used to substantially heat through a selected material, such as heating deeply into a material. Alternatively, a higher frequency can be used to heat more intensely and quickly a shallower amount of material. Therefore, the induction coil 174 and the power source 178 can be designed to provide for a substantially quick heating of a selected layer of the appliqué 164, such as substantially the adhesive layer, a layer just below the adhesive layer, or any appropriate portion thereof. Nevertheless, it will be understood that the frequency can be about 5 hertz to about 200 megahertz, such as about 30 kilohertz to about 800 kilohertz.

The frequency of the power source can be selected based on many things, such as the design of the appliqué 164, the material of the appliqué 164, the thickness of the appliqué 164, the specific releasing agent, the adhesive and other design features. Nevertheless, one skilled in the art will quickly understand the specific design of the induction coil 174, frequency required and the like for the activating device 172 to ensure its proper use.

The induction coil 174 can be designed in any appropriate manner to assist in producing the appropriate field within the appliqué 164, the adhesive layer below the appliqué 164 or the substrate 162. One skilled in the art will understand that the design of the induction coil 174 can impact the efficiency of the heating, the induction of the field, or other appropriate conditions. Nevertheless, it may be selected to provide different properties for different applications and one specific design need not be used.

Further, it will be understood that the appliqué 164, the adhesive layer between the appliqué and the substrate 162, or properties of the substrate 162 can be provided to assist in the induction heating process. For example, the adhesive layer or the appliqué 164 can be provided with a substantially magnetic property, to assist in the induction fields. Nevertheless, it will be understood that the designs may be chosen for any appropriate purpose.

The induction coil 174, as a part of the activating device 172, is also efficient for activating the releasing agent. The induction coil 174 can produce the thermal energy in a selected area and at a selected depth. As discussed above, the induction coil 174 can be powered at various frequencies, to achieve a heating in a selected layer of material. As understood by one skilled in the art, and briefly discussed above, a high frequency can quickly heat a shallow area while a lower frequency could heat a deeper area more effectively. Also, the design of the induction coil 174 can be selected to assist in directing the field that a selected area of the appliqué, the substrate, the adhesive layer, or any selected component. The heating can be efficiently directed to an area, a layer, or the like. This allows for efficient heating of a selected area and depth without heating undesirable portions of the substrate or the appliqué. This can increase the efficiency of heating and activating the releasing agent and also minimize possibility of damage to the substrate or the appliqué.

The heat source, such as the heated adhesive, heated appliqué 164, etc. can be removed once heated. The heat source can include the induction coil 174, the heated appliqué 164, the heated adhesive layer 16, the heated releasing agent, or any heated portion. As discussed above, because the induction coil 174 can heat a selectively specific area, once the releasing agent has been activated the adhesive layer, the appliqué, around the area where the releasing agent has been activated by heating can be quickly removed from the substrate 162. By removing the portion once it has become activated, the heated or hot portion is also removed from the substrate 162. Therefore, degradation of the substrate can be minimized by quick removal of the heated portion. This also allows the appliqué 164 with a releasing agent to be placed in substantially sensitive areas, such as heat sensitive areas, without substantial risk of damaging the area. The heat source heats a small area, the heated material can be easily removed, and thermal energy saturation of the substrate 162 can be reduced or eliminated. Thus, the removal process can be efficient and concern regarding heat degradation of the substrate can be nearly eliminated.

The heating process such as with the induction coil 174, can also be done with the appliqué including a metalized coating, such as that disclosed in U.S. Pat. No. 6,177,189 entitled, "Appliqués Providing Corrosion Protection", incorporated herein by reference. The metalized or metal in the coatings can be used with the induction coil 174 to select an appropriate frequency, coil design, or heating time. The metalized coating can also assist in placing the heat where selected and reduce heat saturation in the substrate 162.

Also, films or appliqués 164 can include meshes or foils of metal or conductive polymers, such as those disclosed in U.S. Pat. No. 6,790,526, entitled, "Oxyhalopolymer Protective Multifunctional Appliques And Paint Replacement Films", incorporated herein by reference for the disclosure thereof. Thus, the meshes or foils of metal or conductive polymers can also be used in combination with the induction coil 174, frequency or power, and other selected features to heat a selected layer of the appliqué 164, adhesive layer, etc. at least by having induced in the meshes or foils of metal or conductive polymers a current for heating. The mesh or foils of metal or conductive polymers can be selected of a material, thickness, shape, design, etc. to achieve a selected heating speed, are, and the like to ensure a selected heating of the releasing agent with the induction coil 174.

Further, it will be understood that the releasing device 172 can be used with any appropriate appliqué. The adhesive layer between the appliqué 164 and the substrate 162 can be any appropriate adhesive layer. Although the adhesive layer can include the releasing agent, including those discussed above, it need not necessarily have the releasing agent. Removing a device 172 can include the induction coil 174 to efficiently heat the adhesive layer and the adhesive can be an appropriate adhesive that can be released or removed upon heating the adhesive. Therefore, the adhesive layer need not necessarily include a releasing agent but can be efficiently heated with the heating device 172 to assist in removing the appliqué from the substrate 162.

What is claimed is:

1. A system to remove an appliqué comprising:
   an aircraft substrate;
   a multilayer pressure sensitive adhesive placed between an appliqué and the aircraft substrate to substantially form a bond between the appliqué and the aircraft substrate;
   a releasing agent dispersed in a single layer of the multilayer pressure sensitive adhesive, the single layer located adjacent either the aircraft substrate or the appliqué, wherein the releasing agent includes a constituent adapted to be selectively activated to change between a neutral form and an activated form, such that the activated form dissolves the adhesive;
   a heat source operable to heat the releasing agent in order to activate the releasing agent.

2. The system of claim 1, further comprising:
   an edge sealant adapted to be placed on the exterior of the appliqué;
   an edge sealant releasing agent dispersed in the edge sealant;
   wherein the appliqué includes an exterior and the edge sealant is positioned on the exterior of the appliqué to assist in the bond between an edge of the appliqué and the substrate.

3. The system of claim 1, wherein the single layer is located adjacent the aircraft substrate.

4. The system of claim 1, wherein the single layer is located adjacent the appliqué.

* * * * *